(12) United States Patent
Nakajima

(10) Patent No.: US 6,713,981 B2
(45) Date of Patent: Mar. 30, 2004

(54) POLE POSITION DETECTOR FOR MOTOR

(75) Inventor: Yuki Nakajima, Kanagawa (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/902,100

(22) Filed: Jul. 11, 2001

(65) Prior Publication Data

US 2002/0011814 A1 Jan. 31, 2002

(30) Foreign Application Priority Data

Jul. 11, 2000 (JP) ........................................ 2000-210085

(51) Int. Cl.[7] .............................. H02P 5/00; H02P 7/00; G05F 1/00; G01B 7/00
(52) U.S. Cl. ................. 318/491; 318/647; 324/207.12; 324/207.2; 310/68 B; 310/156.05
(58) Field of Search .............................. 318/491, 538, 318/830, 647, 652, 653, 661; 324/207.12, 207.25, 207.13, 207.2, 207.22; 310/68 B, 156.01, 156.05

(56) References Cited

U.S. PATENT DOCUMENTS

| 4,086,519 | A | * | 4/1978 | Persson ....................... 318/254 |
| 4,785,242 | A | * | 11/1988 | Vaidya et al. ............. 310/68 B |
| 5,850,130 | A | * | 12/1998 | Fujisaki et al. ............. 318/439 |
| 5,994,870 | A | * | 11/1999 | Kaneko et al. ............. 318/798 |
| 6,043,624 | A | * | 3/2000 | Masaki et al. ............... 318/723 |
| 6,133,655 | A | * | 10/2000 | Suzuki et al. .......... 310/156.06 |
| 6,172,498 | B1 | * | 1/2001 | Schmidt et al. ........ 324/207.12 |
| 6,328,136 | B1 | * | 12/2001 | Tauchi et al. ................ 318/254 |
| 6,389,910 | B1 | * | 5/2002 | Eisenhauer ............ 73/862.193 |
| 6,445,154 | B1 | * | 9/2002 | Toyozawa et al. .......... 318/700 |

FOREIGN PATENT DOCUMENTS

| EP | 0 944 164 A1 | 9/1999 | |
| JP | 08107694 A | * 4/1996 | ............. H02P/6/20 |
| JP | 08308292 A | * 11/1996 | ............. H02P/7/63 |
| JP | 09-121584 | 5/1997 | |
| JP | 11-215881 | 8/1999 | |
| JP | 2000-33500 | 2/2000 | |
| WO | WO 99/08374 | 2/1999 | |

* cited by examiner

Primary Examiner—Robert Nappi
Assistant Examiner—Edgardo San Martin
(74) Attorney, Agent, or Firm—McDermott, Will & Emery

(57) ABSTRACT

A pole position detector correctly detects a pole position of a permanent magnet motor. Each magnetic sensor (27) provides an electric signal in response to leakage flux from a magnet rotor (17). A computation unit (2) detects a change in the output of the magnetic sensor as a base pole position θ, corrects the base pole position by Δθ according to the base pole position, the magnitude of each stat or current (IU, IV, IW), and a current phase, and calculates correct rotation angles θre and θre' accordingly. With low-cost magnetic sensors (27), the pole position detector corrects the outputs of the magnetic sensors affected by stat or current and provides a correct pole position or a correct rotor rotation angle.

2 Claims, 15 Drawing Sheets

FIG.3

```
TARGET
TORQUE → [2-PHASE CURRENT COMMAND UNIT] 5 ── Id* ──→ [2-PHASE-TO-3-PHASE CONVERTER] 6 ──→ [POWER CONVERTER] 7 ──→ 3U 3V 3W → MOTOR 1
T*                                         Iq*                                                                                  ↑ HALL IC 27, 27, 27
                                           ↑ θre'                                                                               
                                    [POLE POSITION COMPUTING UNIT] 2
                                           ↑ θre
                Id ←──────────── [3-PHASE-TO-2-PHASE CONVERTER] 4 ← IU IV IW
                Iq ←────────────
```

| STATE | | 1 | 2 | 3 | 4 | 5 | 6 | 1 |
|---|---|---|---|---|---|---|---|---|
| U, V, AND W OUTPUTS FROM HALL ICS | U-PHASE | H→L | L | L | L→H | H | H | H→L |
| | V-PHASE | H | H | H→L | L | L | L→H | H |
| | W-PHASE | L | L→H | H | H | H→L | L | L |
| SET VALUE OF $\theta$ | | 0 | $\dfrac{\pi}{3}$ | $\dfrac{2\pi}{3}$ | $\dfrac{3\pi}{3}$ | $\dfrac{4\pi}{3}$ | $\dfrac{5\pi}{3}$ | 0 |
| CORRECTION FOR $\theta$ | | \multicolumn{7}{c}{$+\Delta\theta$} |

FIG.14

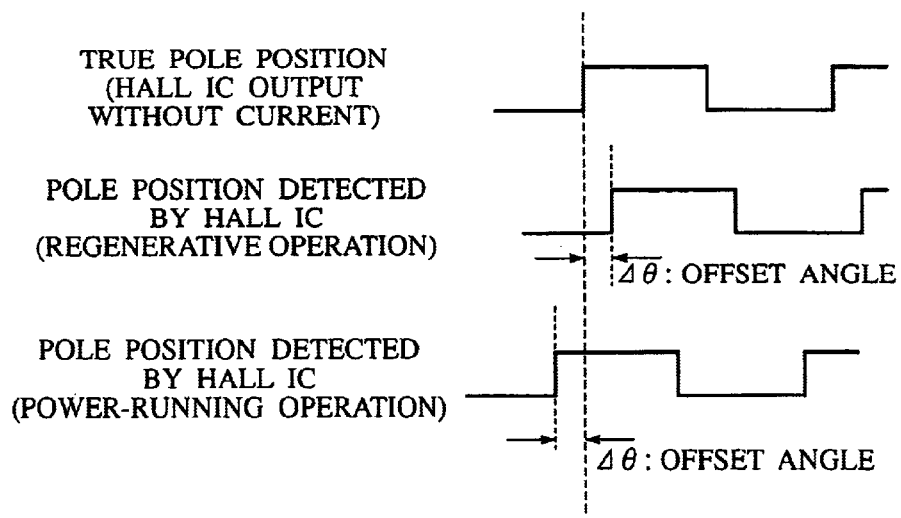

TRUE POLE POSITION (HALL IC OUTPUT WITHOUT CURRENT)

POLE POSITION DETECTED BY HALL IC (REGENERATIVE OPERATION)

$\Delta\theta$: OFFSET ANGLE

POLE POSITION DETECTED BY HALL IC (POWER-RUNNING OPERATION)

$\Delta\theta$: OFFSET ANGLE (REFERENCE POSITION
PHASE ANGLE = 0°)

FIG.17A  CORRECTION DATA MAP (WITH MAGNETIC PIECES)

| POWER-RUNNING CURRENT COEFFICIENT \ PHASE ANGLE | 90° | 67.5° | 45° | 22.5° | 0° | -22.5° | -45° | -67.5° | -90° |
|---|---|---|---|---|---|---|---|---|---|
| 20% | 0.00 | -0.08 | -0.13 | -0.19 | -0.23 | -0.23 | -0.19 | -0.12 | 0.00 |
| 50% | 0.00 | -0.15 | -0.29 | -0.42 | -0.50 | -0.58 | -0.54 | -0.38 | 0.00 |
| 80% | 0.00 | -0.19 | -0.38 | -0.58 | -0.73 | -0.88 | -1.00 | -0.96 | 0.00 |
| 120% | 0.00 | -0.23 | -0.48 | -0.71 | -0.96 | -1.23 | -1.54 | -2.00 | 0.00 |

FIG.17B

| REGENERATIVE CURRENT COEFFICIENT \ PHASE ANGLE | 90° | 112.5° | 135° | 157.5° | 180° | 202.5° | 225° | 247.5° | 270° |
|---|---|---|---|---|---|---|---|---|---|
| 20% | 0.00 | 0.08 | 0.13 | 0.19 | 0.21 | 0.21 | 0.17 | 0.12 | 0.00 |
| 50% | 0.00 | 0.15 | 0.27 | 0.40 | 0.50 | 0.58 | 0.58 | 0.38 | 0.00 |
| 80% | 0.00 | 0.19 | 0.38 | 0.58 | 0.73 | 0.90 | 1.00 | 0.96 | 0.00 |
| 120% | 0.00 | 0.23 | 0.48 | 0.71 | 0.96 | 1.23 | 1.54 | 2.00 | 0.00 |

FIG.18A  CORRECTION DATA MAP (WITHOUT MAGNETIC PIECES)

| POWER-RUNNING CURRENT COEFFICIENT \ PHASE ANGLE | 90° | 67.5° | 45° | 22.5° | 0° | -22.5° | -45° | -67.5° | -90° |
| --- | --- | --- | --- | --- | --- | --- | --- | --- | --- |
| 20% | 0 | -4 | -7 | -10 | -12 | -12 | -10 | -6 | 0 |
| 50% | 0 | -8 | -15 | -22 | -26 | -30 | -28 | -20 | 0 |
| 80% | 0 | -10 | -20 | -30 | -38 | -46 | -52 | -50 | 0 |
| 120% | 0 | -12 | -25 | -37 | -50 | -64 | -80 | -104 | 0 |

FIG.18B

| REGENERATIVE CURRENT COEFFICIENT \ PHASE ANGLE | 90° | 112.5° | 135° | 157.5° | 180° | 202.5° | 225° | 247.5° | 270° |
| --- | --- | --- | --- | --- | --- | --- | --- | --- | --- |
| 20% | 0 | 4 | 7 | 10 | 11 | 11 | 9 | 6 | 0 |
| 50% | 0 | 8 | 14 | 21 | 26 | 30 | 30 | 20 | 0 |
| 80% | 0 | 10 | 20 | 30 | 38 | 47 | 52 | 50 | 0 |
| 120% | 0 | 12 | 25 | 37 | 50 | 64 | 80 | 104 | 0 |

POLE POSITION DETECTOR FOR MOTOR

BACKGROUND OF THE INVENTION

The present invention relates to a pole position detector for a motor, employing magnetic sensors.

A conventional brushless DC motor is disclosed in Japanese Unexamined Patent Publication No. 11-215881 in which the motor has a driver employing magnetic sensors. The motor has a pole position detector for detecting a rotational position, or a phase angle, of the rotor The pole position detector has a disk and the rotation center thereof agrees with that of the rotor. The disk has magnetized peripheral areas whose number is the same as that of magnetic poles of the rotor. The pole position detector also has three positional signal generators (U, V, and W) along the periphery of the disk. The signal generators are spaced from each other at intervals of 60° in mechanical angle (corresponding to 120° in electrical angle when the rotor and disk have each four magnetic poles). The signal generators have Hall ICs, respectively, to generate rotational position signals CSU, CSV, and CSW.

Another pole position detector of related art directly detects magnetic flux from each magnet incorporated in a rotor of a motor. The detector arranges a Hall element a predetermined distance away from an end face of the rotor that crosses a rotor shaft. To collect leakage magnetic flux from the magnet, the Hall element has a magnetic piece on the back thereof.

Still another prior art Japanese Unexamined Patent Publication No. 9-121584 discloses a motor that employs magnetic sensors such as Hall elements to directly detect leakage flux from rotor magnets and determine a pole position.

SUMMARY OF THE INVENTION

However, the pole position detector of the prior art must employ the separate disk in addition to the rotor, to increase the size of the detector. Namely, the prior art increases in size, weight, and cost of a motor to which the magnetized/detecting is applied.

The pole position detector of the related art is vulnerable to stat or current. Namely, the output of the Hall element is phase-shifted by stat or current, to incorrectly detect a pole position. When stat or coils pass no current, the output of the Hall element correctly responds to spatial distribution of magnetic field originated from the magnet of the rotor which varies according to the rotational angle of the magnetic pole thereof along a circumference thereof. When the stat or coils pass current, the current forms additional magnetic flux that changes an apparent spatial distribution of magnetic flux, thereby shifting a rotation angle, fluctuating or decreasing torque, and deteriorating motor control.

FIGS. 1 and 2 schematically show shifts caused by stator current in pole positions to be detected by the Hall element. Leakage flux from the rotor changes in response to the position of the magnet as indicated with a curve (a) of FIG. 1. With a d-axis current Id=0 (phase angle β=0), a q-axis current Iq is passed through the stator coils to produce magnetic flux. This magnetic flux is opposite to and 90° (electrical angle) ahead of the magnetic flux (a) produced by the rotor, as indicated with a curve (b) of FIG. 1. The Hall element facing the end face of the rotor is influenced by the sum of the leakage flux from the rotor and the 90°-advanced magnetic flux from the stator coils, as indicated with a curve (b) of FIG. 2. A pole position detected by the Hall element at this time is a function of the magnitude of magnetic flux determined by the current and a phase angle. The detected pole position, therefore, involves a delay in phase from a true pole position. If a field-weakening operation is carried out on the motor under this state by increasing the d-axis current, the phase of magnetic flux produced by stator current advances as the current phase angle β increases, as indicated with curves (b) to (f) of FIG. 1. Consequently, the phase of magnetic flux (pole position) detected by the Hall element according to the sum of magnetic flux from the magnet and magnetic flux from the stator coils advances as indicated with curves (b) to (f) of FIG. 2. In this way, detecting a pole position based on leakage flux from rotor magnets with the use of magnetic sensors such as Hall elements is prone to fluctuations caused by stator current.

Japanese Patent Application No. 2000-033500 filed by this inventor has disclosed a technique of employing magnetic materials to collect rotor leakage flux at ends of the magnetic materials to improve the correctness of pole position detection. This technique is advantageous in reducing the influence of stat or current but is affected by the stat or current in each gap or occupied nonmagnetic material between the magnetic materials, to slightly change the phase of the output of each Hall element.

There are conventional devices such as resolvers and rotary encoders that precisely detect a pole position of a motor. These devices, however, are expensive compared to the detectors that employ magnetic sensors such as Hall elements, and therefore, are inapplicable to cost-sensitive applications.

An object of the present invention is to provide a low-cost pole position detector for a motor, employing magnetic sensors to correctly detect the rotational position of each magnetic pole of the motor which leads the desired rotational angle of the rotor thereof.

In order to accomplish the object, one aspect of the present invention provides a pole position detector for a motor, having a magnetic sensor for providing a time course of an electric signal representing spatial magnetic distribution of a rotor of the motor or rotational member linked with the rotor along a circumference thereof caused by rotation thereof, and a computation unit for detecting a base pole position of the rotor from the electric signal, detecting a stat or current magnitude and a current phase, correcting the detected base pole position according to the detected base pole position, stat or current magnitude, and current phase, and providing the corrected base pole position as a pole position.

According to another aspect of the present invention, a detecting method of pole position for a motor comprises detecting magnetic changes caused by rotation of a rotor of the motor or by rotation of a rotational member linked with the rotor, detecting a base pole position of the rotor according to the detected magnetic changes, and correcting the detected base pole position according to the detected base pole position, a stat or current magnitude, and a current phase.

BRIEF DESCRIPTION OF THE DRAWINGS

FIG. 3 is a functional block diagram showing a pole position detector for a motor according to a first embodiment of the present invention;

FIG. 5 explain a pole position detecting principle of the first embodiment, in which FIG. 5(A) is a sectional view showing the mechanical structure of the pole position detector of the first embodiment seen from an end face thereof and FIG. 5(B) is an exploded side view of magnetic pieces;

FIG. 13 is a table showing Hall IC outputs and corresponding phase angles according to the first embodiment;

FIG. 14 explains a deviation of a pole position detected by a Hall IC from a true pole position of a magnet motor;

FIGS. 17A and 17B are tables of correction data map for power-running operation and regenerative operation of a motor with magnetic pieces according to the first embodiment; and FIGS. 18A and 18B are tables of correction data map for power-running operation and regenerative operation of a motor without magnetic pieces according to the first embodiment.

DESCRIPTION OF THE PREFERRED EMBODIMENTS

Figure 1:
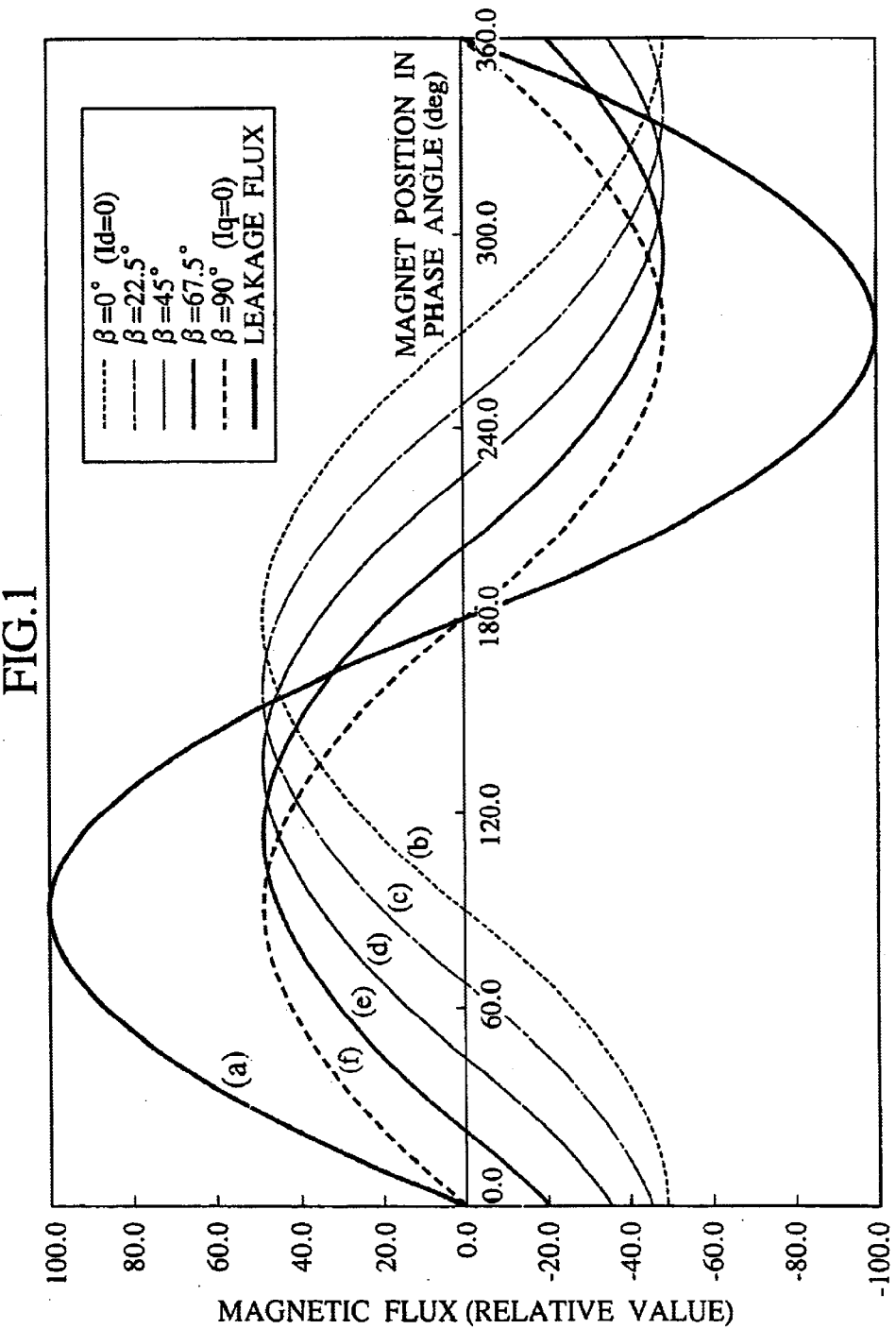
FIG. 1 is a graph showing leakage flux changing in response to rotor magnet positions in the motor of FIG. 2.
Figure 2:
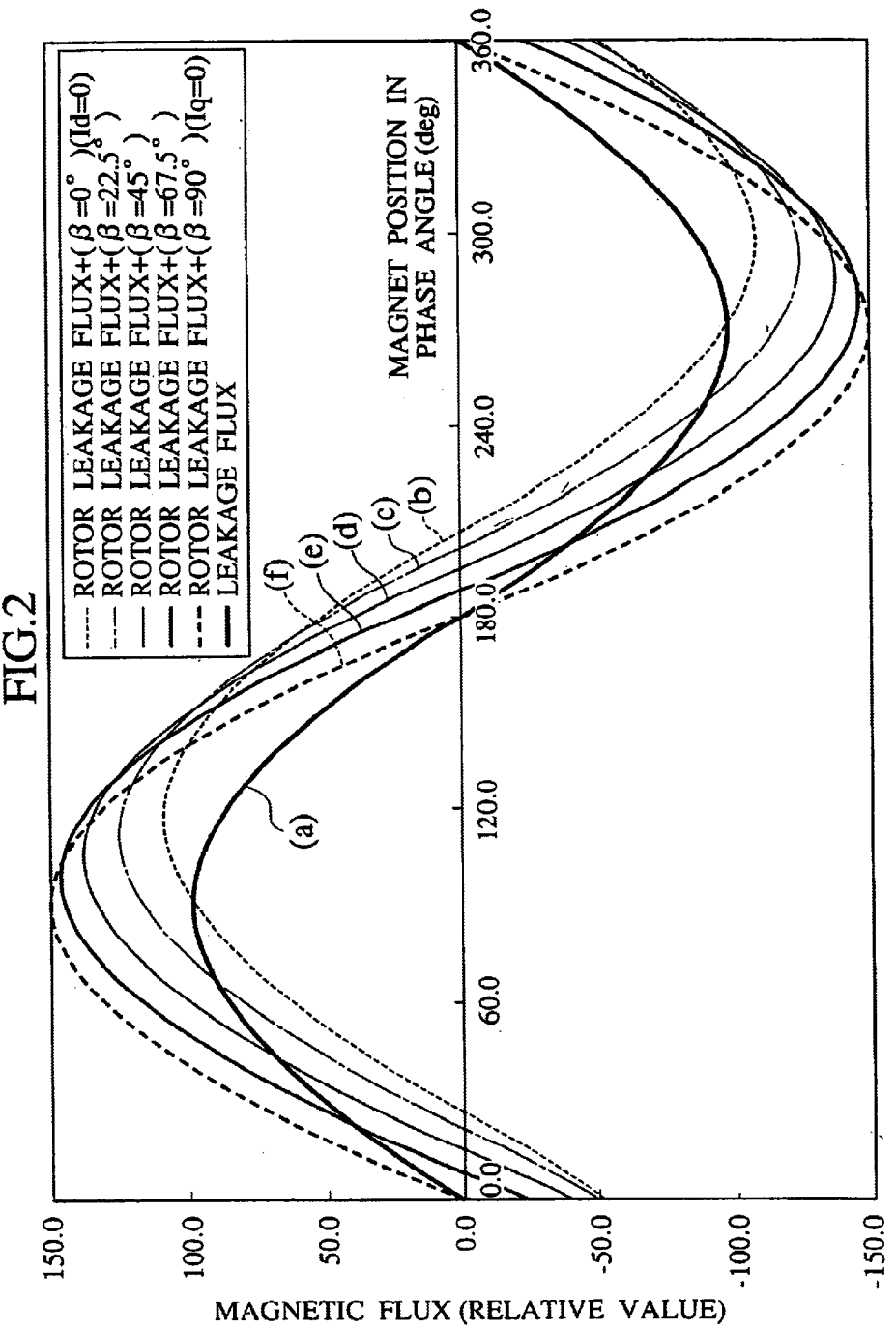
FIG. 2 is a graph showing changes in the sum of leakage flux from a rotor and magnetic flux produced by stat or coil current, the changes in the flux sum influencing pole position detection by a Hall IC.
Figure 4:
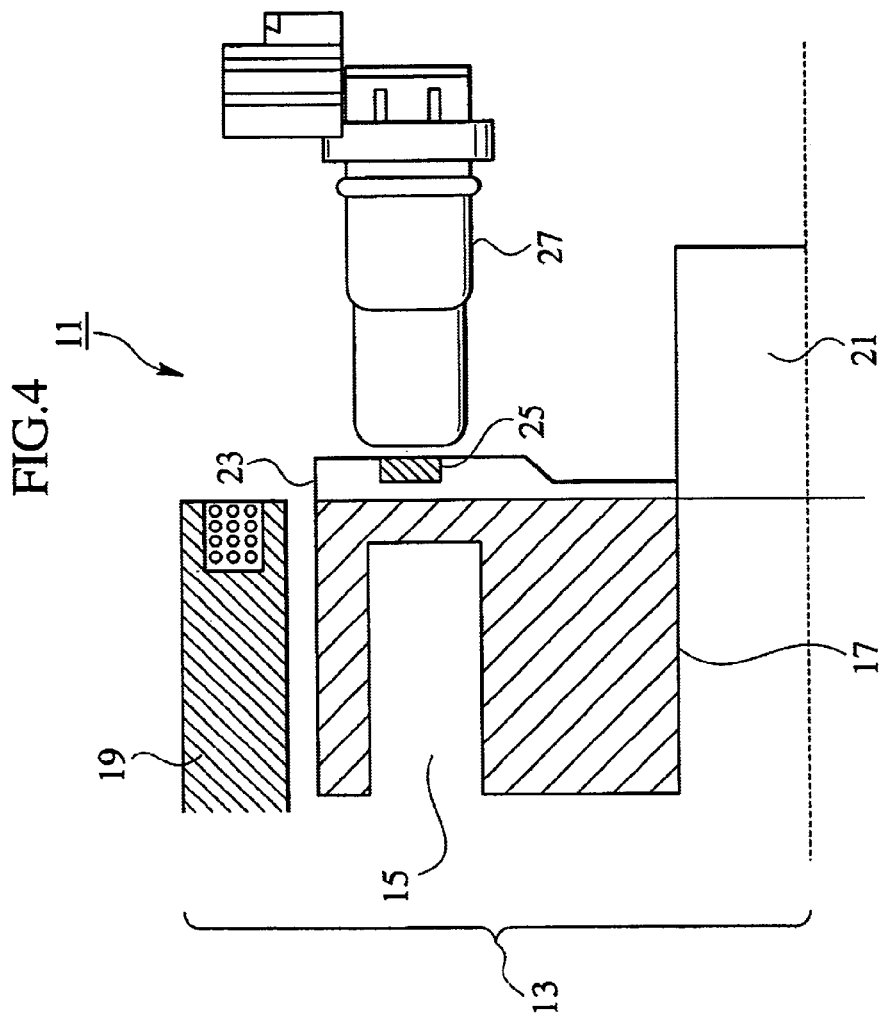
FIG. 4 is a sectional view showing the mechanical structure of the pole position detector of the first embodiment.
Figure 5:
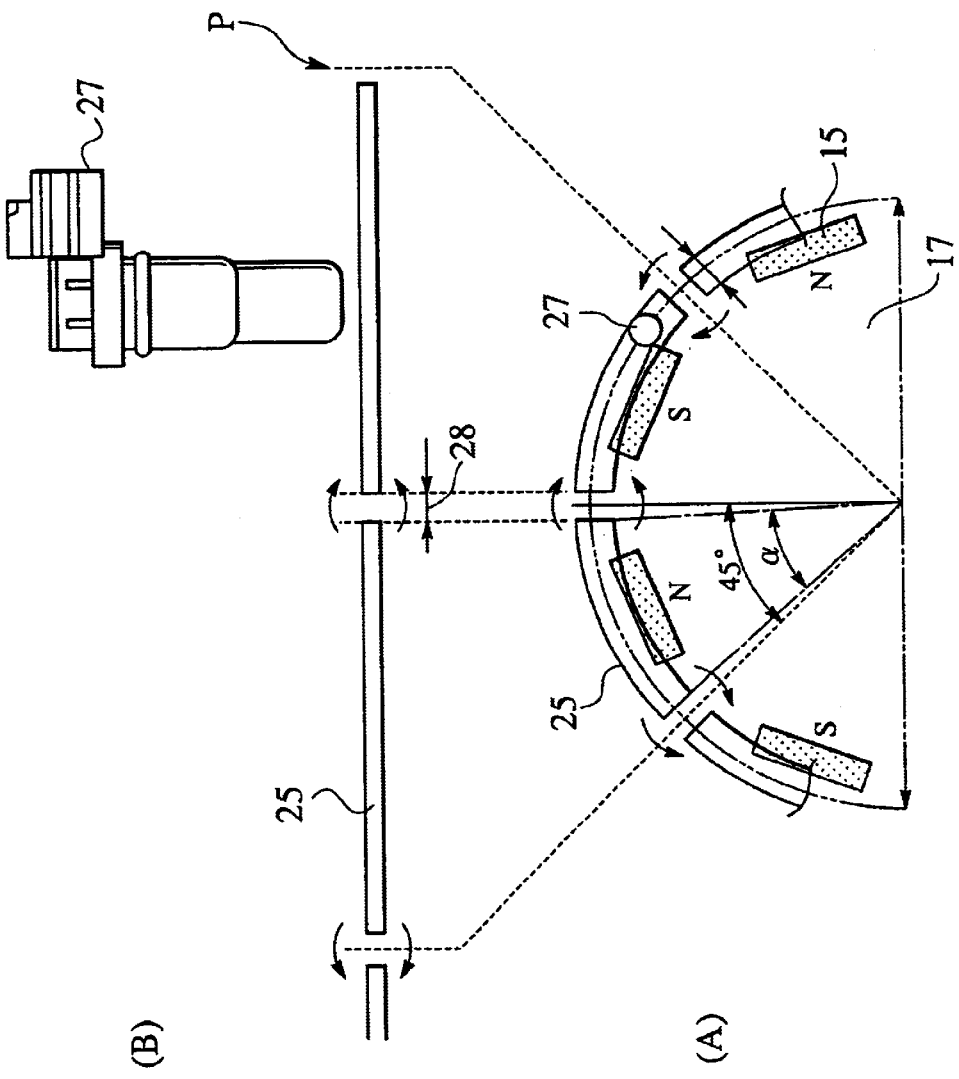

Various embodiments of the present invention will be explained with reference to the accompanying drawings. FIG. 3 is a functional block diagram showing a pole position detector 11 for a motor according to the first embodiment of the present invention, and FIGS. 4, 5A, and 5B are sectional views showing mechanical arrangements of the detector 11. The mechanical arrangements of FIGS. 4, 5A, and 5B are basically the same as those shown in FIGS. 4, 5a, and 5b of the Japanese Patent Application No. 2000-33500 filed by this inventor. However, control functions of the present invention are different from those of the prior application.

The mechanical arrangements of the pole position detector 11 of the first embodiment will be explained with references to FIGS. 3, 4, 5A and 5B. A motor 1 has a rotor 17, a stator 19, and magnetic pieces 25 supported by an end plate 23. The rotor 17 includes magnets 15 that are arranged such that their polarities alternate one after another. The stator 19 has filed coils and is arranged along the periphery of the rotor 17, wherein the rotor 17 has an end face that crosses a shaft 21. The end face is provided with an end plate 23 of nonmagnetic material. The end plate 23 has magnetic pieces 25 that are magnetized by magnetic flux from the corresponding magnets 15, thereby collecting the magnetic flux.

Magnetic sensors 27 are fixed to a casing of the motor 1 and face the magnetic pieces 25 so as to respond to magnetic flux from the magnetic pieces 25. In FIG. 3, there are three magnetic sensors 27 to detect leakage flux from the rotor 17. Each magnetic sensor 27 detects a magnetic flux density distribution or magnetic changes in a circumferential direction of the rotor 17 and provides an electric signal representing the detected magnetic changes. The magnetic sensors 27 may be Hall elements, MR elements, or GMR elements.

The electric signals from the magnetic sensors 27 are supplied to a driver (not shown) of the motor 1 and are used to detect a pole position of the rotor 17 and generate a field current for each phase according to required torque each of which is supplied to each corresponding field coil of the stator 19.

The functional structures of the first embodiment will be explained with reference to FIG. 3. The three magnetic sensors 27 such as Hall ICs detect leakage flux from the rotor 17. The outputs of the magnetic sensors 27 are transferred to a pole position computing unit 2. Each of the three magnetic sensors 27 generates ON/OFF signal at intervals of 180°, and the signals shifted by 120° from each other are transferred to the pole position computing unit 2 which in result detects base pole positions at intervals of 60°.

Three-phase currents IU, IV, and IW passing through the field coils of the motor 1 are detected by current sensors 3U, 3V, and 3W, respectively, and the detected currents are transferred to a 3-phase-to-2-phase converter 4. The converter 4 converts the three-phase currents according to a present pole position θre into two-phase currents Id and Iq, which are transferred to a 2-phase current command unit 5.

The command unit 5 compares an externally provided target torque T* with the 2-phase currents Id and Iq and computes 2-phase current commands Id* and Iq*, which are converted into 2-phase voltage commands. These 2-phase voltage commands are supplied to a 2-phase-to-3-phase converter 6. The converter 6 converts the voltage command values Id* and Iq* into three-phase values according to a pole position θre' for PWM control. The converted three-phase voltage commands are supplied to a power converter 7, which uses the voltage commands as PWM command voltages to carry out a PWM operation. Namely, the power converter 7 provides the motor 1 with three-phase currents IU, IV, and IW.

Figure 6:
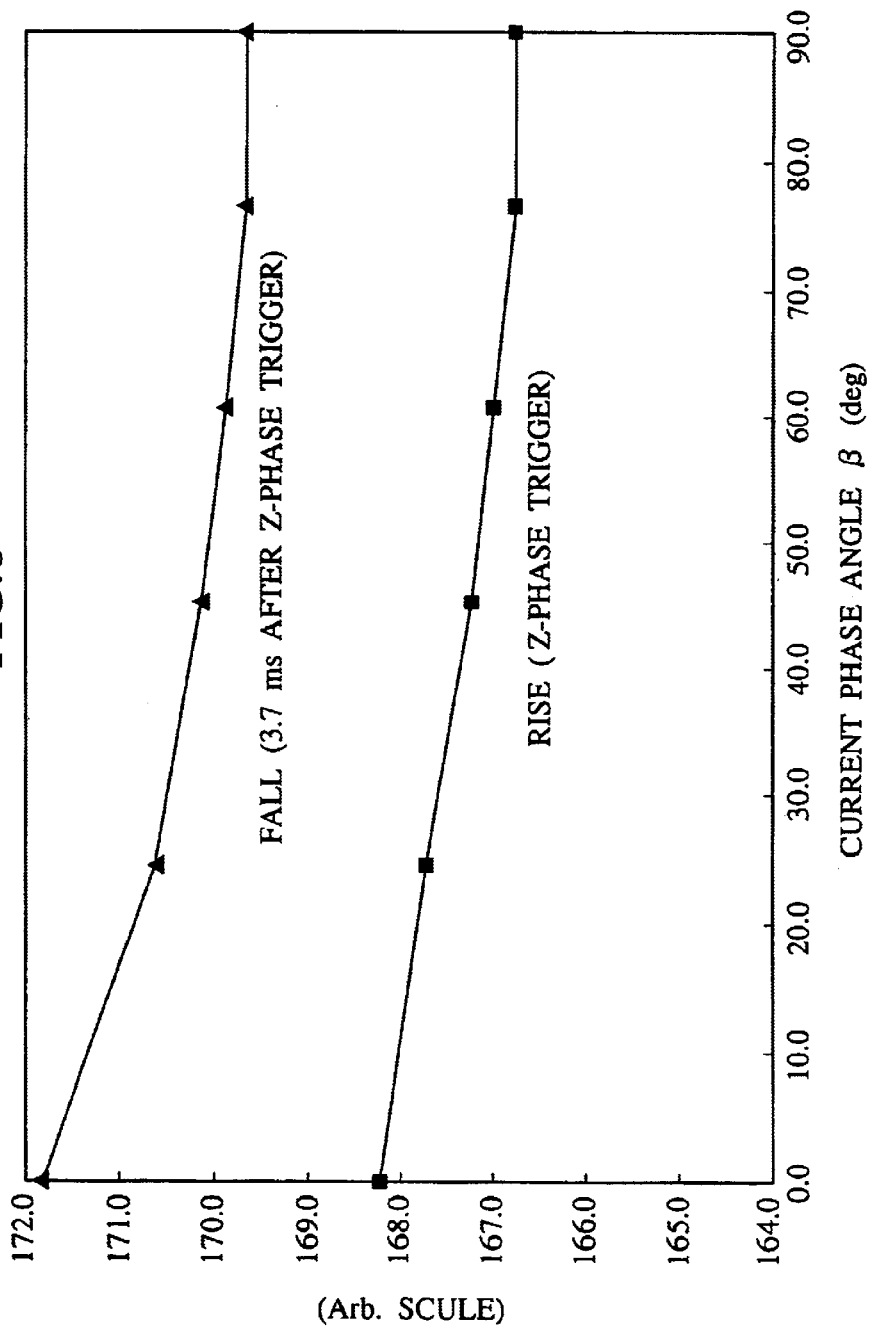
FIG. 6 is a graph showing current phase angles and corresponding shifts in rising and falling magnetic flux edges in a magnet motor with magnetic pieces.
Figure 7:
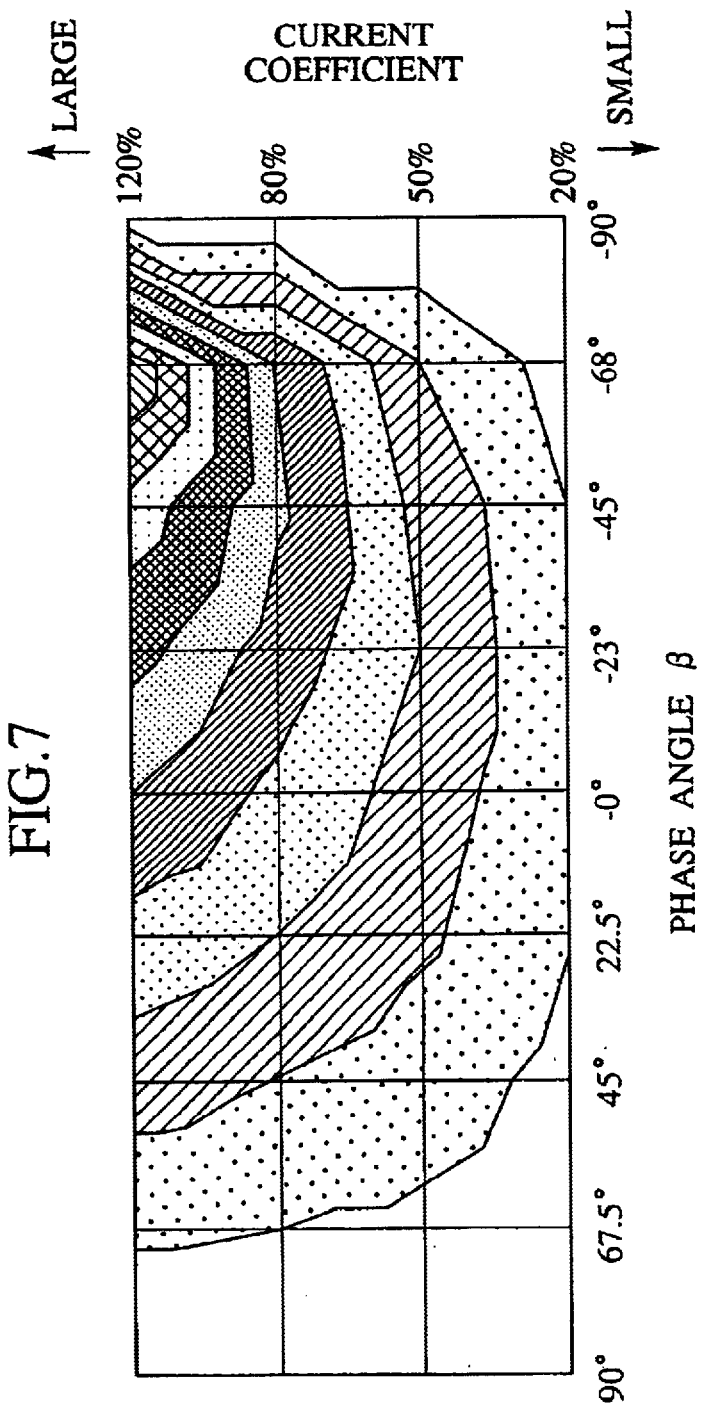
FIG. 7 is an example of a correction data map for power-running operation of a motor with magnetic pieces according to the first embodiment, each pattern representing a correction quantity.
Figure 8:
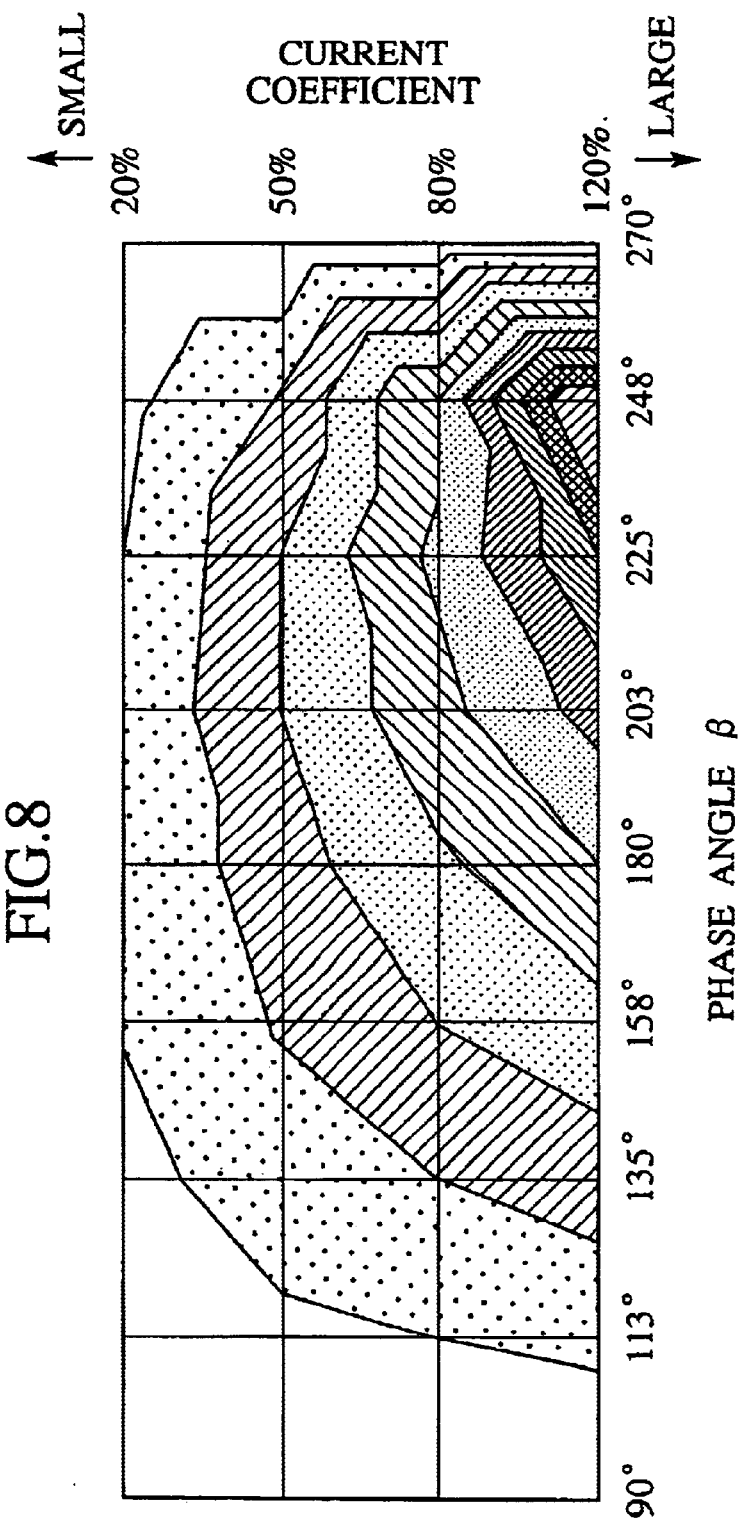
FIG. 8 is an example of a correction data map for regenerative operation of a motor with magnetic pieces according to the first embodiment, each pattern representing a correction quantity.
Figure 9:
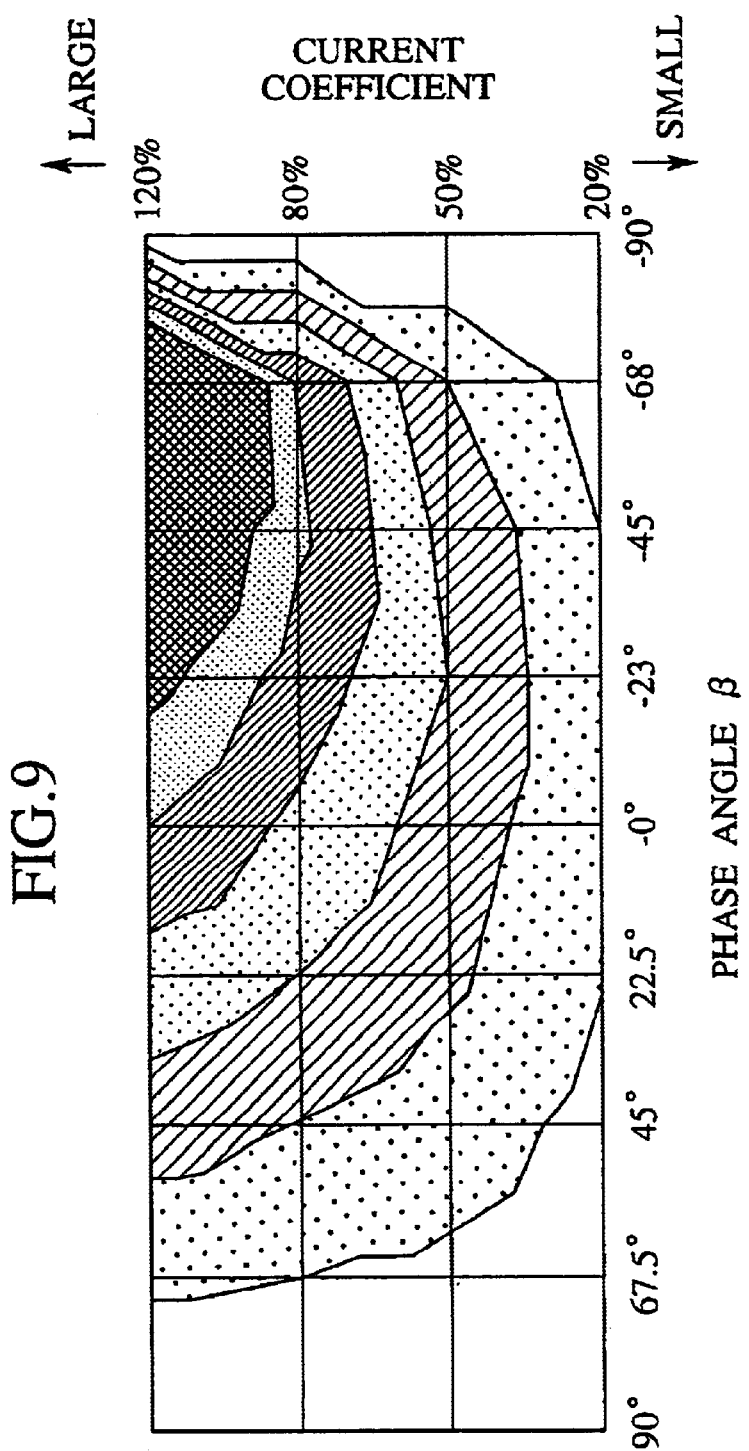
FIG. 9 is an example of a correction data map for power-running operation of a motor without magnetic pieces according to the first embodiment, each pattern representing a correction quantity.
Figure 10:
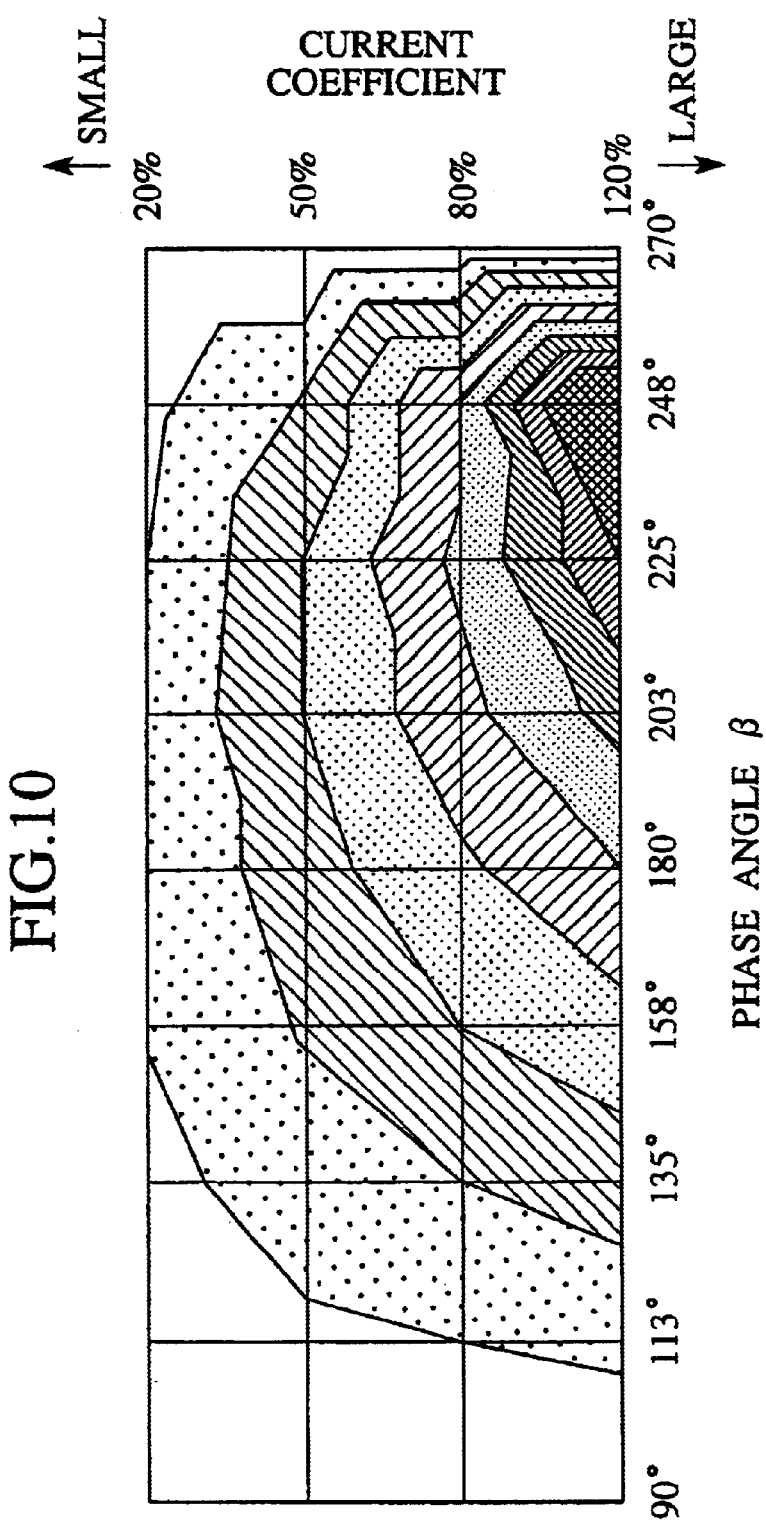
FIG. 10 is an example of a correction data map for regenerative operation of a motor without magnetic pieces according to the first embodiment, each pattern representing a correction quantity.
Figure 11:
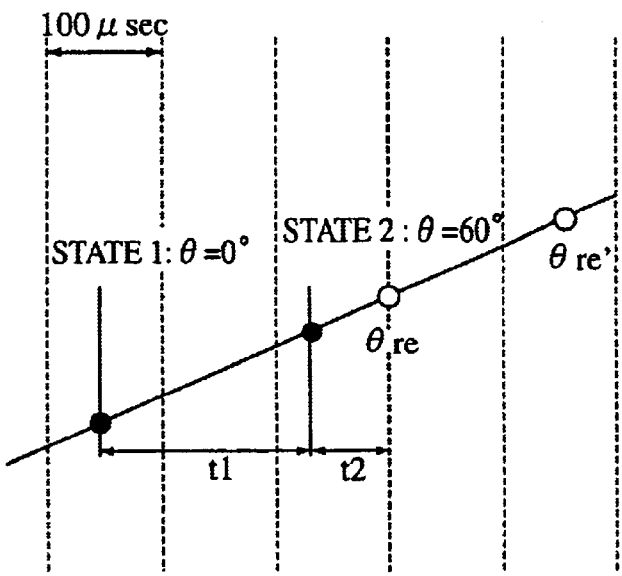
FIG. 11 explains a pole position determining principle of a pole position computing unit according to the first embodiment.

The pole position detecting performance of the pole position detector according to the first embodiment will be explained with reference to FIG. 6 with the stat or receiving current. FIG. 6 shows rising and falling edges of a detected signal of a given phase. The data shown in FIG. 6 has been measured based on a reference position signal (Z-phase) provided by a measurement encoder set on a rotor. It is understood from FIG. 6 that phase angle changes between 0° and 90° at a constant current (2000 rpm, 50 A) influences the rising and falling edges such that the edges advance as the current phase advances. A sector angle α of the magnetic piece 25 (FIG. 5) is set at 42° (corresponding to an electrical phase angle of 168°) in the example of FIG. 6, and therefore, only a small detection error of about 1° to 2.5° will be involved in detecting a pole position. By increasing the angle α(under the condition of α<45°, or α<180° in electrical phase angle), the detection error may further be reduced. Even if an expected detection error is small, the influence of stat or current must be corrected.

To correct the influence of stator current on pole position detection, a correction data map is used. FIGS. 17A and 17B and FIGS. 9 and 10 show correction data maps for power-running operation and regenerative operation with the rotor 17 being provided with the magnetic pieces 25. The correction data maps are stored in the pole position computing unit 2. The current detector 3(3U, 3V, and 3W) detects currents, the 3-phase-to-2-phase converter 4 converts the three-phase currents into two-phase currents Id and Iq, and the magnetic sensors 27 detect a base pole position θ. The unit 2 refers to the data maps and determines a correction quantity Δθ. Then, the unit 2 computes a correct pole position θre for calculating current values and a correct pole position θre' for calculating PWM command voltages and supplies the correct pole position θre and θre' to the 3-phase-to-2-phase converter 4 and 2-phase-to-3-phase converter 6, respectively.

The correction carried out by the pole position computing unit 2 will be explained in detail with reference to FIGS. 9 to 14. Operation intervals of the pole position computing unit 2 are dependent on the performance of a related CPU, and in this embodiment, are 100 μsec. At the edge trigger timing of each of U-, V-, and W-phases detected by the magnetic sensors 27, the pole position computing unit 2 computes base pole position θ according to a table of FIG. 13 and stores the computed pole position. At the same time, the unit 2 finds a state transition time t1 and a computation time t2 shown in FIG. 11 according to an incorporated clock and stores the times t1 and t2. These are carried out in steps S05 to S15 of FIG. 12.

If the pole position computing unit 2 finds a falling edge, i.e., a transition from high level to low level in the output of the U-phase magnetic sensor 27, the unit 2 checks the V- and W-phase magnetic sensors 27. If V-phase output is high and W-phase output is low, the unit 2 determines that it is a state 1 and a base pole position θ=0° as shown in FIG. 13. If the unit 2 finds a rising edge, i.e., a transition from high level to low level in the output of the W-phase magnetic sensor 27, the unit 2 checks the U- and V-phase magnetic sensors 27. If the U-phase output is low and the V-phase output is high, the unit 2 determines that it is a state 2 and a base pole position θ=60° as shown in FIG. 13. Then, the unit 2 finds a transition time t1 between the states 1 and 2 and a computation time t2.

Figure 12:
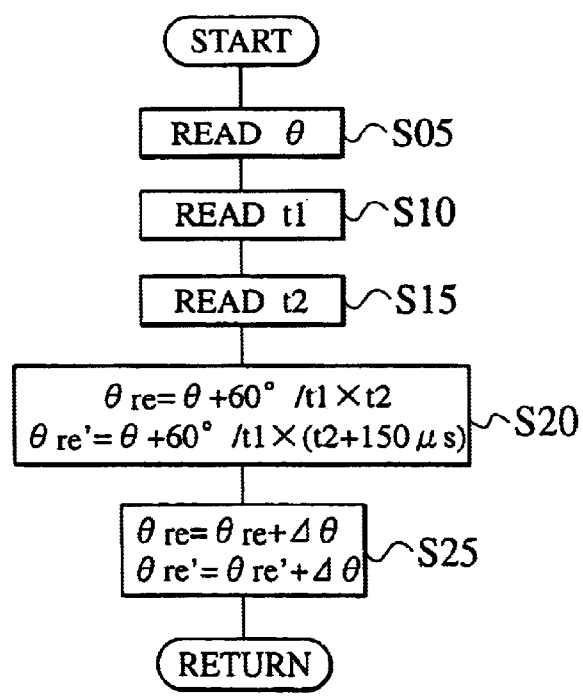
FIG. 12 is a flowchart showing a pole position determining process carried out by the pole position computing unit according to the first embodiment.

According to the found base pole position θ and times t1 and t2, the pole position computing unit 2 computes a pole position θre for current phase conversion and a pole position θre' for PWM control, this is carried out in step S20 of FIG. 12.

Based on actual current values and the phase angles, the pole position computing unit 2 refers to the data map of FIGS. 17A and 17B to find a correction angle Δθ and corrects the pole positions θre and θre'. The corrected pole positions θre and θre' are supplied to the 3-phase-to-2-phase converter 4 and 2-hase-to-3-phase converter 6, respectively. These are carried out in step S25 of FIG. 12.

The proportional operations of step S20 using the times t1 and t2 precisely estimate a pole position of the rotor 17, and an example value 150 μs used in step S20 is determined according to a delay in the power converter 7.

In this way, a pole position detected by the magnetic sensors 27 deviates from a true pole position by Δθ (+Δθ in regenerative operation and −Δθ in power-running operation) as shown in FIG. 14 due to the influence of current passing through the stator coils. Accordingly, the pole position detector according to the present invention corrects a base pole position θ detected by the magnetic sensors 27 by a deviation Δθ, to always provide a correct pole position.

The present invention may limit an electrical angle correction quantity applied to a detected pole position below a value obtained by dividing the circumferential angle of a gap 28 (FIG. 5) between the adjacent magnetic pieces 25 by the number of magnetic poles. This leads to minimize a correction quantity while securing the correctness of pole position (rotation angle) detection.

The embodiment mentioned above arranges the magnetic pieces 25 along the periphery of the magnet rotor 17 to collect magnetic flux and make rising and falling edges detected by the magnetic sensors 27 steep. The present invention is also applicable to motors without magnetic pieces 25. In this case, data maps of FIGS. 18A and 18B are used to correct a detected pole position.

If no magnetic pieces 25 for improving pole position detecting sensitivity are provided, larger correction quantities will be needed. In this case, correction data maps of FIG. 9 for power-running operation and FIG. 10 for regenerative operation are used together with FIGS. 18A and 18B.

Figure 15:
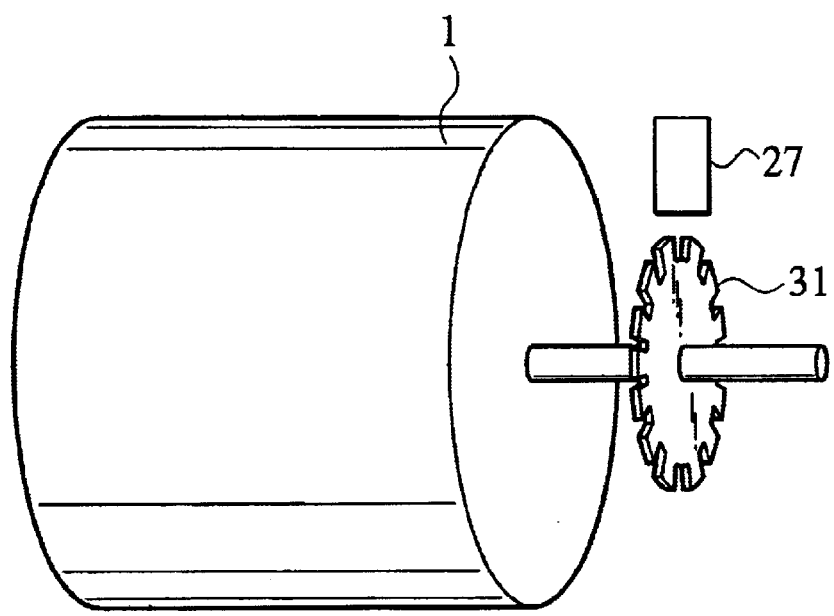
FIG. 15 is a perspective view roughly showing a pole position detector for a motor according to a second embodiment of the present invention.
Figure 16:
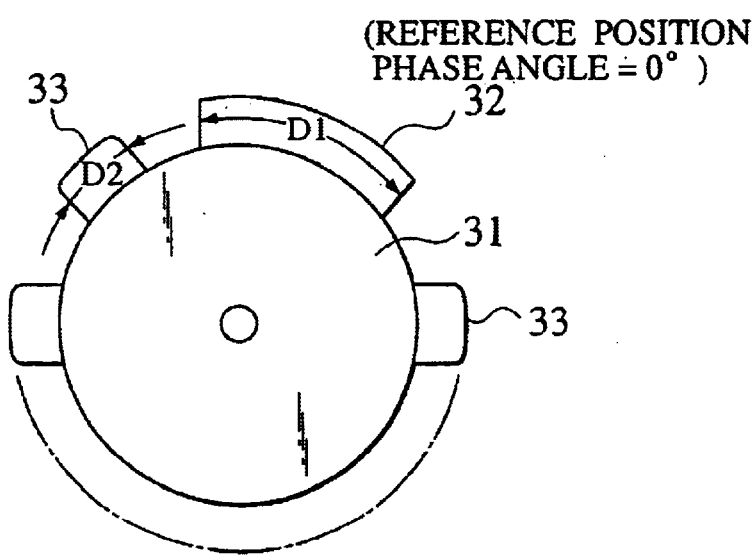
FIG. 16 is a front view showing an auxiliary gear according to the second embodiment.

A pole position detector for a motor according to the second embodiment of the present invention will be explained with reference to FIGS. 15 and 16. Instead of detecting leakage flux from rotor magnets to determine a pole position of a magnet motor, the second embodiment employs a magnetic material that rotates in synchronization with the rotational output of the motor 1. For example, an auxiliary gear 31 is attached to an output shaft of the motor 1, and a magnetic sensor 27 is arranged in the vicinity of the gear 31. The magnetic sensor 27 may incorporate a magnetic material for collecting magnetic flux. One tooth 32, which may correspond to a pole position of the motor 1 as 0 degree, on the gear 31 may have a width D1 that is different from a width D2 of other teeth 33, so that a reference position may easily be detected. The gear 31 may have 12 tooth corresponding to 12 magnetic poles. A control technique of this embodiment is the same as that of the first embodiment.

The second embodiment finds a base pole position θ from the waveform of a signal provided by the magnetic sensor 27, finds a correction quantity for canceling the influence of stator current from experimentally obtained data maps such as those of FIGS. 18A and 18B, and correctly determines pole positions θre and θre'. The second embodiment realizes large degree of freedom for a location to install the magnetic sensor 27.

The entire content of a Japanese Patent Applications No. 2000-210085, filed on Jul. 11, 2000 is hereby incorporated by reference. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A pole position detector for a motor, comprising:
   a magnetic sensor configured to sense magnetic flux from a magnet rotor, the magnet rotor having plurality of magnets that are oppositely magnetized one after another; and a computation unit configured to detect a base pole position of the magnet rotor according to changes in the output of the magnetic sensor, detect stator current magnitude and a current phase, and correct the detected base pole position according to the detected base pole position, the stator current magnitude, and the current phase, wherein the magnet rotor has magnetic pieces on an end face thereof that crosses a shaft of the magnet rotor;

each of the magnetic pieces is magnetized by magnetic flux from a corresponding one of the magnets; and the magnetic sensor is fixed to a casing to face the magnetic pieces.

2. A pole position detector for a motor, comprising:

a magnetic sensor configured to sense magnetic flux from a magnet rotor, the magnet rotor having plurality of magnets that are oppositely magnetized one after another; and a computation unit configured to detect a base pole position of the magnet rotor according to changes in the output of the magnetic sensor, detect stator current magnitude and a current phase, and correct the detected base pole position according to the detected base pole position, the stator current magnitude, and the current phase, wherein the computation unit detects the base pole position according to one of rising and falling edges contained in the output of the magnetic sensor, and the computation unit limits an electrical angle correction quantity applied to the base pole position below a value obtained by dividing the circumferential angle of a gap between the adjacent magnetic pieces by the number of magnetic poles.

* * * * *